(12) United States Patent
Liu et al.

(10) Patent No.: US 7,321,766 B2
(45) Date of Patent: Jan. 22, 2008

(54) SYSTEM AND METHOD FOR TESTING PORTABLE COMMUNICATION DEVICES

(75) Inventors: Jerry J. Liu, Sunnyvale, CA (US); Thomas M. Snyder, Batavia, IL (US); John Cavanaugh, Windsor, CA (US)

(73) Assignee: Agilent Technologies, Inc, Santa Clara, CA (US)

( * ) Notice: Subject to any disclaimer, the term of this patent is extended or adjusted under 35 U.S.C. 154(b) by 731 days.

(21) Appl. No.: 10/348,556

(22) Filed: Jan. 21, 2003

(65) Prior Publication Data

US 2004/0203467 A1    Oct. 14, 2004

(51) Int. Cl.
*H04Q 7/20* (2006.01)

(52) U.S. Cl. ............... 455/425; 455/423; 379/27.01

(58) Field of Classification Search ........... 455/423, 455/425, 67.11, 67.14, 115.2, 67.4, 418; 379/22.01–22.02, 379/27.01–27.03
See application file for complete search history.

(56) References Cited

U.S. PATENT DOCUMENTS

| | | | |
|---|---|---|---|
| 4,554,410 A | 11/1985 | Furumoto | |
| 5,802,073 A | 9/1998 | Platt | |
| 5,805,666 A * | 9/1998 | Ishizuka et al. | 379/1.01 |
| 5,875,398 A * | 2/1999 | Snapp | 455/424 |
| 5,953,372 A * | 9/1999 | Virzi | 375/224 |
| 5,966,428 A * | 10/1999 | Ortiz Perez et al. | 379/27.02 |
| 6,118,982 A * | 9/2000 | Ghisler et al. | 455/67.14 |
| 6,279,125 B1 * | 8/2001 | Klein | 714/38 |
| 6,314,086 B1 * | 11/2001 | Katz et al. | 370/241 |
| 6,385,739 B1 | 5/2002 | Barton et al. | |
| 6,397,042 B1 * | 5/2002 | Prentice et al. | 455/67.14 |
| 6,426,693 B1 * | 7/2002 | Inomata | 340/539.21 |
| 6,490,434 B1 | 12/2002 | Grundvig et al. | |
| 6,651,111 B2 * | 11/2003 | Sherman et al. | 710/14 |
| 6,690,923 B1 * | 2/2004 | Ortiz Perez et al. | 455/74.1 |
| 6,847,819 B1 * | 1/2005 | Sprigg et al. | 455/445 |
| 6,886,049 B2 * | 4/2005 | Wong | 710/8 |
| 6,912,386 B1 * | 6/2005 | Himberg et al. | 455/423 |
| 7,024,161 B1 * | 4/2006 | LaMedica, Jr. | 455/67.11 |
| 2001/0014603 A1 * | 8/2001 | Bucknell et al. | 455/420 |
| 2004/0203686 A1 * | 10/2004 | Bahr | 455/418 |
| 2004/0203693 A1 * | 10/2004 | Mehta et al. | 455/419 |

FOREIGN PATENT DOCUMENTS

EP    1 146 749    8/2000

OTHER PUBLICATIONS

T. Socolofsky & C. Kale, A TCP/IP Tutorial (RFC 1180) Jan. 1991, www.cse.ohio-state.edu, Chapter 2, p. 227.*
European Search Report dated May 3, 2004.

* cited by examiner

*Primary Examiner*—Edward F. Urban
*Assistant Examiner*—Christian A. Hannon

(57) ABSTRACT

There are disclosed systems and methods for performing diagnostic testing on portable communication devices, such as cellular telephones. In one embodiment, diagnostic commands are generated internal to the communication device and processed within the device as though the test commands had been received from a remote location. The processed commands can be analyzed either within the portable device or remote therefrom. For remote processing, a wireless port is provided.

36 Claims, 4 Drawing Sheets

SYSTEM AND METHOD FOR TESTING PORTABLE COMMUNICATION DEVICES

TECHNICAL FIELD

The present invention relates in general to portable communication devices, and in particular to systems and methods for performing and retrieving diagnostic information in such portable communication devices.

BACKGROUND OF THE INVENTION

Many existing portable devices, such as cellular telephones, include one or more diagnostic applications (which may be in the form of software, firmware, and/or the like) operable to gather diagnostic information regarding the operation of the device. Such information may be helpful in diagnosing, and perhaps correcting, the cause of one or more abnormalities occurring in the operation of the device.

These abnormalities can occur in various hardware systems or in software applications within the device. In the present environment, in order to retrieve such diagnostic information from a cellular telephone, an "AT" command (similar to the command sets used to control modems) is sent to the serial port of the telephone from an external source. Typically, such command sets are sent by a test application executing on an external controller (such as a personal computer) attached to the serial port of the cellular telephone via a serial cable. In response to the receipt of the aforementioned command sets, the cellular telephone performs internal testing and transmits the diagnostic information to the external controller via the serial cable. The external controller, in turn, analyzes the information to determine if there are problems with the cellular telephone.

One drawback with the above-discussed approach is that it requires an additional piece of equipment, namely the external controller, to initiate the request for data and to then retrieve the diagnostic information from the cellular telephone. This additional piece of diagnostic equipment is one that users of cellular telephones typically do not own or have access to. Therefore, in order to retrieve the aforementioned diagnostic information, the cellular telephone must be carried (or sent) back to the manufacturer, and/or service provider, to be diagnosed. Even if the user of the cellular telephone owned such a controller, there is considerable complexity in configuring a general purpose computer for such tasks. Thus, the existing approaches are suitable only for a centralized professional testing system.

The typical serial port hardware driver is a piece of software which communicates with the actual hardware. Typically, hardware is visible to software by being mapped to some memory addresses (this is typically called memory mapped I/O). For example, a certain hardware signal may be mapped to memory address 0x800000. There is actually no memory at 0x800000. When the software writes a 1 to 0x800000, the hardware signal gets set to high. And when the software writes a 0, the line gets set to low. This is how software interacts with hardware.

Typically, the software that performs these functions, called the hardware driver, is separated in a separate module from the rest of the software. For instance, there may be a software function called set_trigger( ) which actually writes to location 0x800000 as in the above example. The rest of the software system only knows to call set_triggers( ), not to write to 0x800000. This is so the software system is not impacted if the hardware designer remaps the line somewhere else in memory.

The serial port device driver has knowledge of how to carry out serial communication protocol functions. It is capable of performing handshaking and sets the signals according to some predefined transitions so both sides of the communication link can exchange data. The device driver talks to the hardware through a hardware driver described above. That is, it does not write to an memory addresses, but rather does so through the hardware driver. The device driver can be said to encompass the hardware driver.

BRIEF SUMMARY OF THE INVENTION

One embodiment of the present invention allows the user to perform loop-back and other diagnostic procedures within the portable device and allows for the retrieval of the aforementioned diagnostic information without the need for a physical connection to an external controller.

In one embodiment, the existing control structure of the portable device (including programs running on the device) is used to send the request for diagnostic testing to the device's serial port through a serial port driver. Rather than the regular serial port driver, requests are sent through the "virtual serial port" hardware driver, which has the same API as a regular serial port driver. This "virtual serial port" hardware driver itself then intercepts the request and sends the request back through the software layers of the device using the same device paths the request would have taken had it come from an external source through the regular serial port driver. The device then performs diagnostic testing on the "rerouted" request and the results of this diagnostic testing are sent back to the device's serial port where it is again rerouted to an internal diagnostic application. If desired, the diagnostic test results could be sent wirelessly to a remote test center for diagnostic purposes.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the teachings of the present invention, reference is now made to the following descriptions taken in conjunction with the accompanying drawing, in which.

DETAILED DESCRIPTION OF THE INVENTION

Before beginning a description of the embodiments of the present invention, it may be helpful to review how testing is accomplished in existing portable communication devices, such as, for example, cellular telephones.

Figure 1:
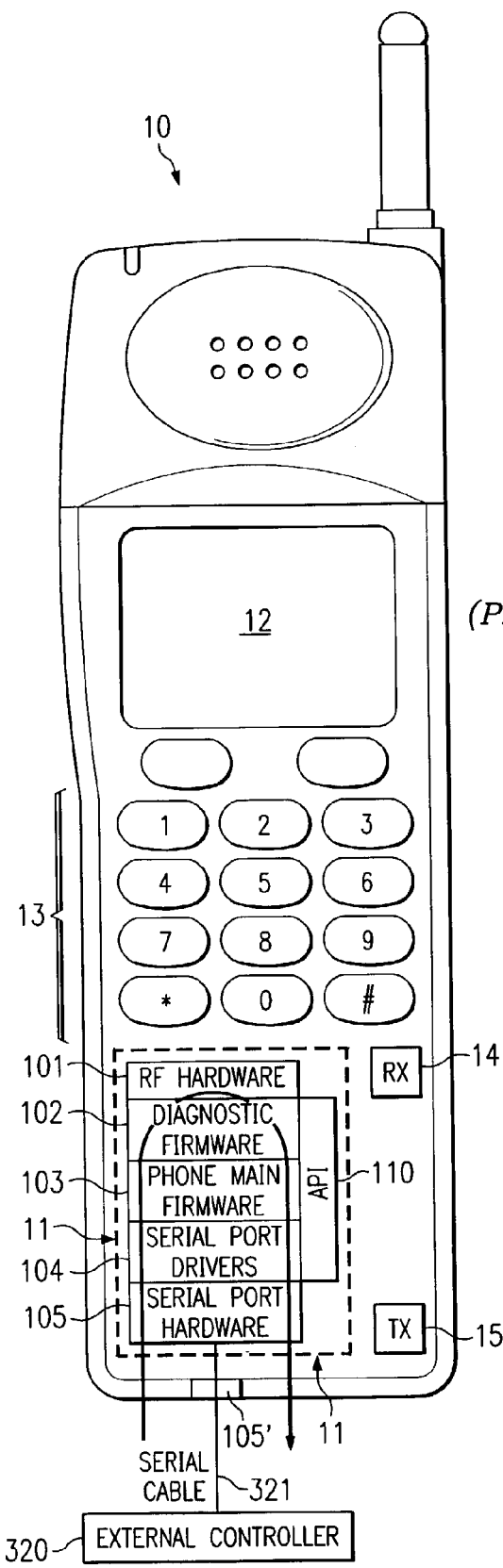
FIG. 1 shows one example of a prior art testing and diagnostic system.

FIG. 1 shows prior art, telephone 10 having screen 12, keypad 13, receiver 14 and transmitter 15. Inside the telephone is control/memory 11 which, for example, could include memory, processors, software and/or firmware applications, and related hardware. Typical cellular telephones have RF hardware, such as hardware 101, included within control/memory 11, as well as diagnostic firmware 102, telephone main firmware 103, serial port drivers 104, serial port hardware 105 including externally exposed plug 105, and application interface 110.

Typically, to obtain diagnostic information, telephone 10 is attached to external controller 320 via serial cable 321 connected to plug 105'. External controller 320 typically is a personal computer having within it sophisticated diagnostic testing routines including diagnostic logic. A test application running on external controller 320 sends commands, such as an AT command, to device 10 via serial port hardware 105' and 105. These commands cause the telephone to send diagnostic results to the controller via serial port drivers 104. Once those diagnostic results are obtained by the external controller, the results are analyzed to determine the status of the telephone.

In operation, when serial port 105 of telephone 10 receives a test command from external controller 320, for example an "AT" test command, that command is passed through the various layers 104, 103, 102, 101 triggering responses in the moss layers. These responses are processed by diagnostic firmware (or software) 102 and then sent back through the same layers and through serial port hardware 105, and serial cable 321 to external controller 320 for diagnostic testing within controller 320.

Figure 2:
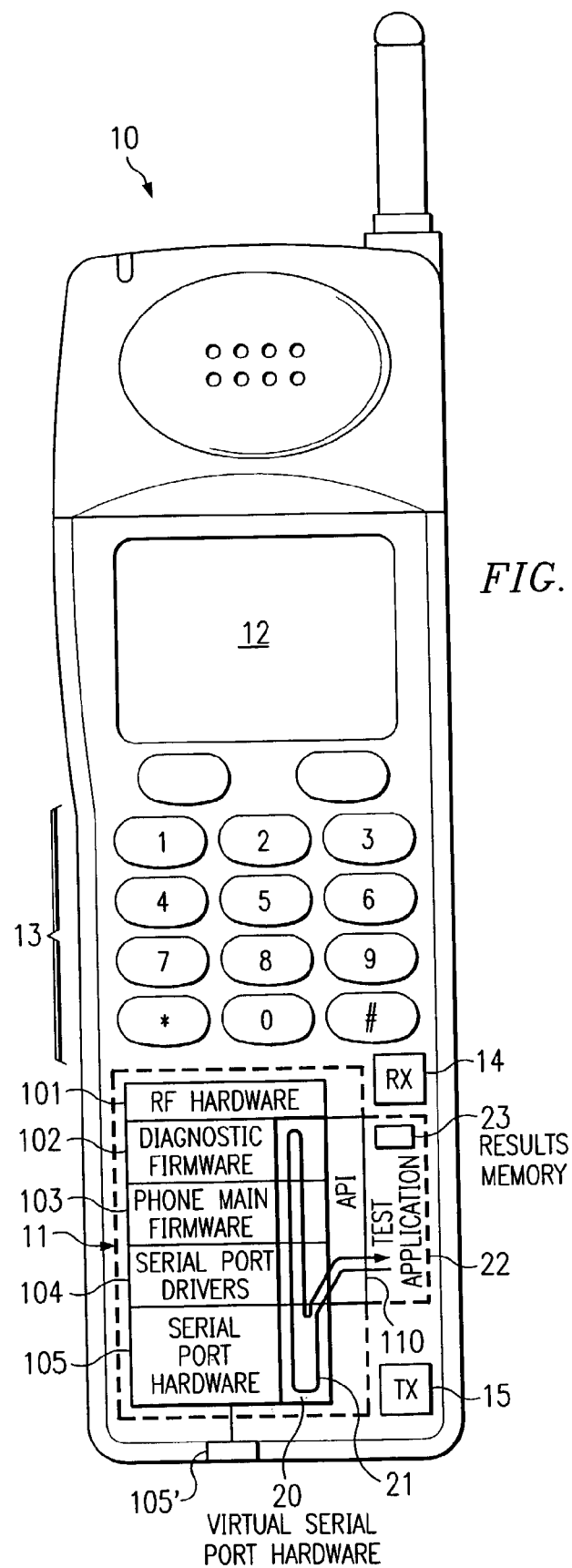
FIG. 2 shows one embodiment of the inventive teachings where a portable communication device contains internal diagnostics.

According to the present invention, FIG. 2 shows test application 2 added to control/memory 11 on telephone 10 via application interface API 107. The runtime environments and API 107 available on telephone 10 are used to accept test commands from test application 106 and to send these commands to "virtual serial port" hardware driver 20, which retransmits this information back up to serial port drivers 104 so that the command looks like it is coming from an external controller (such as controller 320, FIG. 1) via serial port hardware 105. The test trigger command (which originated internal to phone 10) follows arrow 21 through elements 104, 103, 102, 101, triggering internal diagnostic testing. The test results follow arrow 21 back toward serial port 105', but instead of being sent to an external device, the test results are passed from virtual serial port hardware 20 through API 110 to test application 22. Thus, when the results come back from diagnostic firmware 102, the serial port driver forwards those test results to the serial port where the request "appeared" to come from. The results actually go to "virtual" serial port 20, which, as discussed, sends them back through the serial port protocol stack once again to test application 22.

All serial port drivers have a buffer of some sort to store incoming data. This is because data may appear on the serial line while the main program is busy doing something else, so the serial port driver dutifully stores this data into memory (which takes very little CPU cycle time). Advantage is taken of this storage process in that when a test signal has passed through the device it is stored in the virtual port and not sent out. The port driver then signals the existence of this stored data (for example, through an interrupt or a memory flag) so that the main software can read the data. The loopback function is accomplished through two steps. First, the virtual hardware driver described is used such that the system does not write the data out to the actual serial port hardware, but, as discussed, stores the data in a buffer. The write ( ) function places the internal test data in this buffer, and a subsequent read ( ) causes the data from this buffer to be sent back through the devise for testing. This driver has the same API as a regular serial driver and will have the same behavior with respect to signaling an interrupt when there is data to be read in the buffer. Second, the virtual driver is added to the firmware listing on the device so that it is available in memory and thus behaves as any other driver stored in the lookup table. Before the diagnostics are run, the system modifies the entry for the serial hardware so that the pointer points to the new driver as opposed to the original driver and the normal processes within the device then control the testing. After the diagnostic tests, the pointer can be changed back to the original driver.

Note that the test command set can be activated by a user, for example, using keys 13 or by voice command. The test commands can also be generated internally, for example, by test application 22. Internal activation can be periodically activated or activated upon a detected trouble condition. Internal activation can be performed by having a program that runs in the background. This program would wake itself up (generally operating systems contain functions to allow a process to put itself to sleep for some period of time) periodically and check the hardware for abnormal states. Also, voice protocol stacks on these phones generate software interrupts upon state transitions (such as from idle to dialing, dialing to connected, etc.) or upon some abnormal exceptions (for example, loss of received signal, lost touch with base stations, etc.). Operating systems allow programs to be activated by software interrupts, so the system must register code with the desired interrupts so that the new driver can be woken up by the operating system.

When the test results are provided to test application 22, that application, in one embodiment, performs test analysis thereon. If desired, the test analysis results can be communicated to the user via screen 12, or speaker 14, and/or the results can be stored in results memory 23 for future use. Typically, the results are tested against some expected value or range of values.

Figure 3:
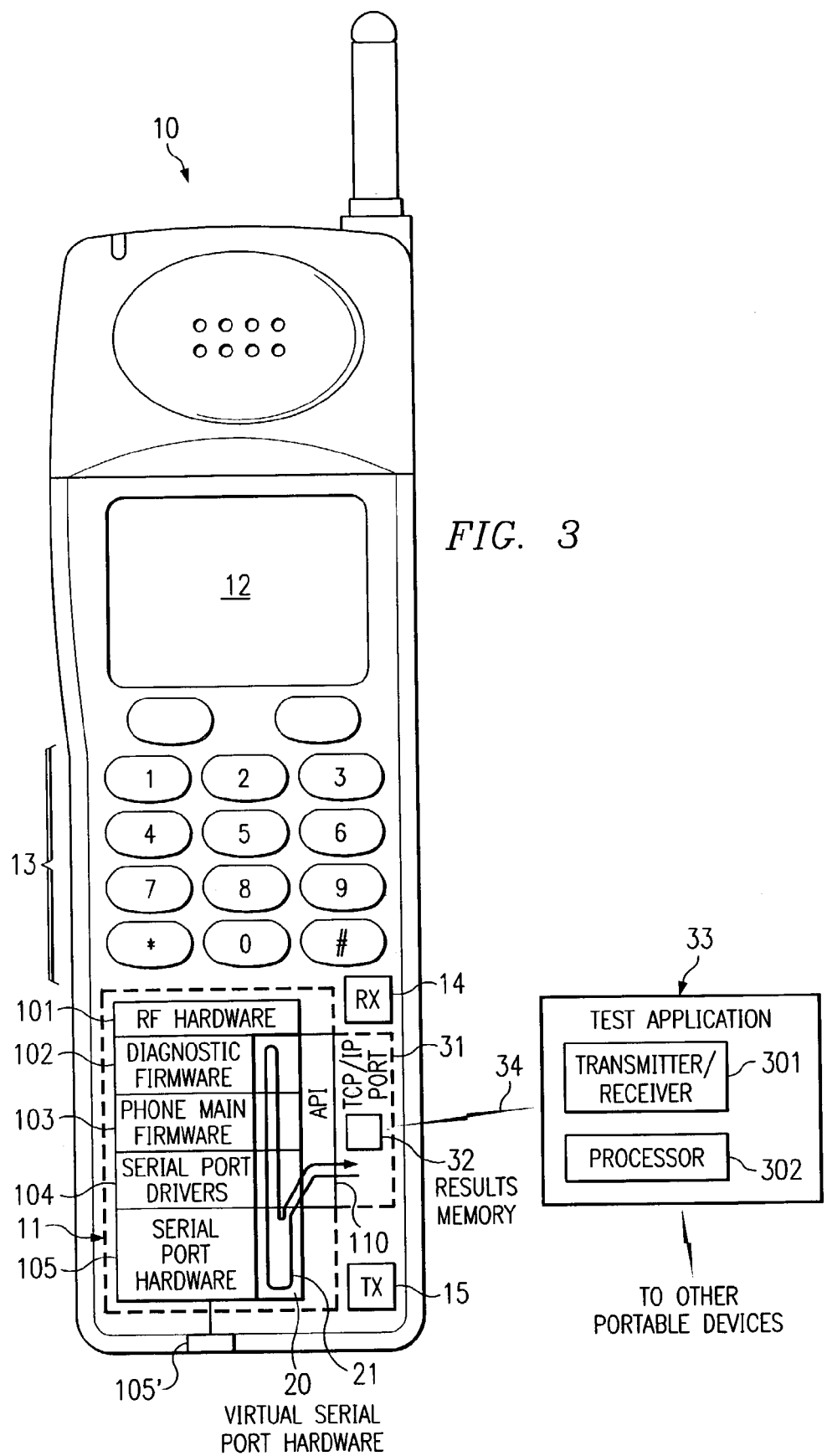
FIG. 3 shows an embodiment of the inventive teachings where a portable communication device performs internal testing and sends the results to a remote site.

FIG. 3 shows an embodiment of the invention where the test data is generated as discussed with respect to FIG. 2, but the test results are analyzed, at least in part, remote from the telephone. This remote analysis can be, for example, performed in a PC or in a central test facility that can analyze test results from a plurality of portable devices. As shown in FIG. 3, TCP/IP port 31 is added to telephone 10, either in addition to test application 22, or in substitution therefore. In the embodiment shown, TCP/IP 31 port communicates via wireless link 34 to remote test application 33 where the test result data is received via transmitter/receiver 301 and the received data is analyzed under control of processor 302. Application 33 can be the same as above-discussed with respect to application 22, or it can be more robust, if desired.

Note that remote test application 32 can be a stand-alone system or can be built into the telephone network. The wireless transmission can be over the cellular network or over a separate network. In a preferred embodiment the communication would be over a cellular network. Cellular networks (for example, CDMA2000, GPRS) can carry data as well as voice. The data would be encoded either in a textual markup language like XML or in some more compact binary representation and transmitted to application 33. From the software point of view, and from a functional standpoint, wireless communication would be the same as using a wireline network. Other possibilities include Wi-Fi (IEEE 802.11) or Bluetooth, which are short-ranged wireless technologies also used to transmit data. The telephone could display to a user a message, such as "The voice quality is below a pre-specified level, would you like to notify the carrier?". If desired, the test analysis can be transmitted back to telephone 20 for storage in results memory 202.

The virtual serial port hardware that is described herein is actually software that appears as a regular serial port device driver to the software higher up on the protocol stack, but actually does not talk to any hardware. A regular serial port driver supports functions like read( ) and write( ). The function write( ) sends bits out over the actual hardware serial line, and read( ) gets bits from a buffer that stores the bits that come in over serial line. In the "virtual serial port" hardware driver, the write( ) function, rather than sending data out over the serial line, actually writes the data into the same buffer that its read( ) function will get data from. In essence, the client ends up reading the same bits that it wrote out, which it accomplished by linking both functions to the same buffer. It is as if a wire connected the read and write lines of the serial port together, except it is done in software rather than hardware.

Figure 4:
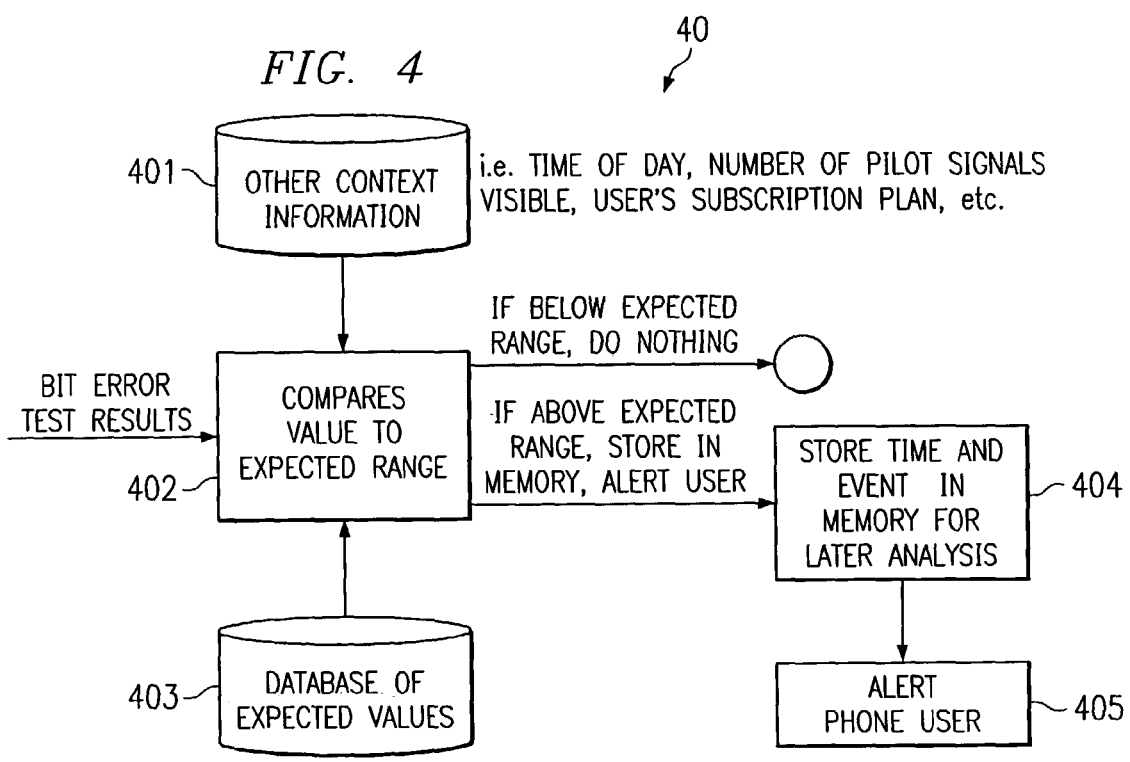
FIG. 4 shows an embodiment of a test analysis block diagram.

FIG. 4 shows flow chart 40 having processes 401-405 when the test analysis takes place in one embodiment. In process 401, the telephone (or other device) gathers information that it "knows", such as time of day, number of digit signals visible, etc., and this information is sent out and "returned" through the device. In process 402 the "referred" data is compared to the expected data and obtained from database 403. If the bit error rate is below a certain level, nothing is done. If the bit error rate is above the acceptable range, the event is stored, via process 404 and, if desired, the user is notified via process 405.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for performing diagnostic testing in a portable communication device, said method comprising:
sending test signals from a source internal to said device to an output driver of said device, wherein said sending of said test signals to an output driver comprises transmitting an AT command request to a virtual port of said device via at least one serial driver, said at least one serial driver then processing said request from said virtual port as though said request had been received from an external source;
redirecting said test signals back to said portable device; and
processing redirected ones of said test signals within said device as though said test signals had been received at said device from an external source.

2. The method of claim 1 wherein said device is a telephone.

3. The method of claim 1 further comprising performing diagnostic testing on said processed signals.

4. The method of claim 3 wherein said diagnostic testing is performed within said portable device.

5. The method of claim 1 further comprising:
communicating said processed test signals to a remote location.

6. The method of claim 5 further comprising:
performing diagnostic testing at said remote location on communicated ones of said test signals.

7. The method of claim 1 wherein said sending of said test signals comprises transmitting said signals from an internal diagnostic application to at least one serial driver, said at least one serial driver re-transmitting said signals back through said device for diagnostic processing.

8. A method for processing diagnostic information in a wireless telephone, said method comprising:
receiving at said wireless telephone a request for diagnostic information, said request having been sent by an application residing within said telephone; and
routing received requests through processing layers residing within said telephone for the purpose of diagnostic testing of said telephone, including said processing layers wherein said receiving and said routing do not involve physically coupling said wireless telephone to an external device, wherein said routed requests prompt test data to be generated based on the current operational status of said telephone, including said processing layers.

9. The method of claim 8 wherein said method further comprises performing diagnostic testing based on generated test data.

10. The method of claim 9 wherein said diagnostic testing is performed remotely from said cellular telephone.

11. The method of claim 9 wherein said diagnostic testing is performed within said wireless telephone.

12. The method of claim 10 wherein said remotely performed diagnostic testing is performed by a system which performs diagnostic testing for a plurality of wireless telephones.

13. The method of claim 12 wherein said test data is wirelessly transmitted to said remote device.

14. The method of claim 13 wherein said wirelessly transmitted test data is sent over a channel other than a channel used to carry speech communications to/from said wireless telephone.

15. The method of claim 13 wherein said wirelessly transmitted test data is sent over a channel used to carry speech communication to/from said wireless telephone.

16. A system for providing diagnostic information for a portable communication device, said device having within it control circuitry for providing diagnostic information as a result of externally provided signals, said system comprising:
  an application residing within said device operable to gather diagnostic information regarding the operation of said device, said application from time to time sending out test commands; and
  means operable within said device upon receipt of said internally generated test commands for processing said test commands as though said test commands had been externally provided, wherein said test commands prompt test data to be generated based on the current operational status of said device.

17. The system of claim 16 further comprising:
  means for delivering processed ones of said test commands to a diagnostic application.

18. The system of claim 17 wherein said diagnostic application resides within said device.

19. The system of claim 17 wherein said diagnostic application resides remote from said device.

20. The system of claim 19 wherein said diagnostic application resides on a PC.

21. The system of claim 19 wherein said diagnostic application is shared in common by a plurality of said portable communication devices.

22. The system of claim 16 wherein said portable communication device comprises a cellular telephone.

23. The system of claim 16 wherein said portable communication device further comprises a wireless data network operable to transmit said processed test commands to another device.

24. A system for performing diagnostic testing, said system comprising:
  a wireless interface for receiving from a portable device test data which has been processed within said device, wherein said processing comprises;
  gathering, by an application residing within said device, diagnostic information regarding the operation of said device, said application from time to time sending out test commands;
  processing said internally generated test commands as though the test commands had been externally provided; and
  a processor for performing diagnostic testing on received test data from said portable device.

25. The system of claim 24 further comprising:
  a transmitter for communicating the results of processed test data to said portable device.

26. The system of claim 25 wherein said communicated results are stored in said portable device.

27. The system of claim 24 wherein said wireless interface is operable for receiving test data from a plurality of said portable devices.

28. The system of claim 24 wherein said portable device is a cellular telephone.

29. The system of claim 28 wherein said wireless interface uses a TCP/IP protocol.

30. A method of performing diagnostic testing on cellular telephone sets, said method comprising the steps of:
  generating a test command within said ones of telephone sets;
  directing generated ones of said test commands within said telephone set such that such test commands appear to the telephone set as coming from an external source over the serial port of said telephone set;
  responding to said directed test commands by sending test result data through said telephone set so that the test data is directed toward said serial port; and
  redirecting said test data which is directed to said serial port to an application located within said telephone set.

31. The method of claim 30 further including the step of:
  analyzing said redirected test data by said application for diagnostic testing purposes.

32. The method of claim 30 further includes the steps of:
  wirelessly sending at least a portion of said redirected test data to a diagnostic testing location remote from said telephone.

33. A system of performing diagnostic testing on a cellular telephone set, said system comprising:
  an application for generating a test command within said telephone set;
  an application operable in conjunction with a serial port of said telephone set for directing generated ones of said test commands within said telephone set such that such test commands appear to the telephone set as coming from an external source over said serial port;
  an application for responding to said directed test commands by sending test result data through said telephone set so that the test result data is directed toward said serial port; and
  said directing application being further operable for redirecting said test data which is directed to said serial port to said generating application located within said telephone set.

34. The system of claim 33 further comprising:
  an application for analyzing said redirected test data for diagnostic purposes.

35. The system of claim 34 further comprising:
  a TCP/IP port for wirelessly sending said redirected test data for diagnostic testing to a location remote from said telephone.

36. The system of claim 34 wherein at least a portion of said analyzing application is located in a cellular network remote from said telephone set.

* * * * *

UNITED STATES PATENT AND TRADEMARK OFFICE
CERTIFICATE OF CORRECTION

| | | |
|---|---|---|
| PATENT NO. | : 7,321,766 B2 | Page 1 of 1 |
| APPLICATION NO. | : 10/348556 | |
| DATED | : January 22, 2008 | |
| INVENTOR(S) | : Liu et al. | |

It is certified that error appears in the above-identified patent and that said Letters Patent is hereby corrected as shown below:

In column 8, line 8, in Claim 30, delete "sets;" and insert -- sets: --, therefor.

Signed and Sealed this

Twenty-fourth Day of June, 2008

JON W. DUDAS
*Director of the United States Patent and Trademark Office*